(12) United States Patent
Vau et al.

(10) Patent No.: US 8,762,414 B2
(45) Date of Patent: Jun. 24, 2014

(54) PROCESS FOR ORGANIZING MULTIMEDIA DATA

(75) Inventors: Jean-Marie Vau, Paris (FR); Thierry Lebihen, Bourg la Reine (FR); Christophe E. Papin, Bois Colombes (FR); Olivier M. Rigault, La Celle St Cloud (FR); Eric Masera, Paris (FR)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 565 days.

(21) Appl. No.: 12/739,965

(22) PCT Filed: Oct. 13, 2008

(86) PCT No.: PCT/EP2008/063717
§ 371 (c)(1),
(2), (4) Date: Apr. 27, 2010

(87) PCT Pub. No.: WO2009/056437
PCT Pub. Date: May 7, 2009

(65) Prior Publication Data
US 2010/0250544 A1    Sep. 30, 2010

(30) Foreign Application Priority Data
Nov. 2, 2007 (FR) .................................. 07 07681

(51) Int. Cl.
*G06F 17/30* (2006.01)
(52) U.S. Cl.
CPC ..................................... *G06F 17/30* (2013.01)
USPC ............ 707/791; 707/802; 707/822; 707/828

(58) Field of Classification Search
CPC ....................................................... G06F 17/30
USPC .......................................... 707/953, 600–899
See application file for complete search history.

(56) References Cited

U.S. PATENT DOCUMENTS

| 6,636,648 | B2 | 10/2003 | Loui et al. |
| 2003/0147558 | A1 | 8/2003 | Loui |
| 2006/0195516 | A1* | 8/2006 | Beaupre ........................ 709/203 |
| 2006/0265421 | A1 | 11/2006 | Ranasinghe et al. |
| 2007/0011042 | A1* | 1/2007 | Kim ................................ 705/10 |

FOREIGN PATENT DOCUMENTS

| JP | 2005-316699 | 11/2005 |
| WO | 2007/046534 | 4/2007 |

OTHER PUBLICATIONS

Guerts et al. Towards Ontology-Driven Discourse: From Semantic Graphs to Multimedia Presentations, the Semantic Web-ISWC 2003, pp. 597-611).*

(Continued)

*Primary Examiner* — Isaac M Woo

(57) ABSTRACT

A multimedia data organization process, i.e. creation, of a photo album or slideshow, said multimedia data being represented by contingent individuals (14*a*, 14*b*, 14*c*, 14*d*, 14*e*, 14*f*) of an instantiated ontology that in addition to generic individuals (EC, C, F, M, T, A) comprises semantic links between individuals, comprising: —the presentation to the user of the choice of at least one individual from the instantiated ontology, and in response to a user-prompted choice, —the selection and organization of a subset of multimedia data corresponding to the contingent individuals of the instantiated ontology according to at least one selection and/or organization rule engaging the user-chosen individual and the related semantic links.

20 Claims, 2 Drawing Sheets

(56) References Cited

OTHER PUBLICATIONS

XP-002481653, Structure and Navigation for Electronic Publishing, John Tillnghast, Giordano Beretta, HP Laboratories, SPIE vol. 3300-0277-786X/98 -pp. 38-45.

XP-002481654, Towards Ontology-Driven Discourse: From Semantic Graphs to Multimedia Presentations, Joose Guerts, et al, pp. 597-611.

Office Action on Japanese Application 2010-531485, mailed May 21, 2013 (English Translation not available).

* cited by examiner

PROCESS FOR ORGANIZING MULTIMEDIA DATA

FIELD OF THE INVENTION

The present invention relates to a process for organizing multimedia data that calls on an ontology, i.e. a structured set of concepts representing knowledge.

The invention has household applications in organizing multimedia data, and in particular digital photo data. It also has applications in customizing the organization of shared multimedia data. The invention's applications extend to providing public access to multimedia content on demand.

The multimedia data integrated into this organization system can include image-related data, sequences of images, sound, text, or any combination of these datasets.

BACKGROUND OF THE INVENTION

The wide range of multimedia data capture and reproduction equipment now available has generated a significant increase in the volume of data that users have access to and that they can share using this equipment. In particular, the increase in the memory capacities of digital cameras has generated an increase in the number of photographs taken during any given event.

The large volume of data liable to be presented prompts us to sort through and organize this data. The sort-through employed may depend not only on the person the multimedia data is intended for but also on the media via which the data is to be presented.

To illustrate this point, digital photograph data can be organized to create a slideshow or an album of printed proofs. Several albums related to the same event may include different photographs depending on the people they were intended for.

The same is true for video clip data, sound data, text data or any combination of multimedia data.

While the final presentation may be pleasing, users often find it tedious having to go through the data sorting, classification and organization steps.

Documents (1) and (2) whose references are specified at the end of the description describe various image creation and album creation techniques.

SUMMARY OF THE INVENTION

The creation of different presentations for different people and for different presentation media is generally a tedious task, regardless of the method used to classify or index the multimedia data and regardless of the tools users are able to use to create an individual data presentation.

An example that will be used as an illustration throughout this description is the presentation of marriage photos. The choice of photographs to be selected for a presentation should ideally depend on the person the presentation is intended for, i.e. the happy couple, the parents, friends, witnesses etc., as well as on the presentation media, i.e. slideshow, photo album, a fun object, a 3D object, etc.

The object of the invention is to provide a method that makes it far easier to organize digital data, at least in a certain number of given contexts.

It is also an object of the invention to provide a user with different means of organizing the same multimedia dataset for different target people, and with far less effort to put in.

To achieve these goals, the object of the invention is a process for organizing multimedia data in which the multimedia data is represented by contingent individuals of an instantiated ontology that among other things includes generic individuals and semantic links between individuals.

The process can be carried out with a computer, such as a personal computer or a server, running a software.

It can still be carried out with a processor of a specific multimedia device, such as a camera, or a digital photoframe.

The process can also be performed on a device with an application specific integrated circuit.

The method comprises:
  the presentation to the user of the choice of at least one individual from the instantiated ontology, and in response to a user-prompted choice,
  the selection and organization of a subset of multimedia data corresponding to the contingent individuals of the instantiated ontology according to at least one selection and/or organization rule engaging the user-chosen individual and the related semantic links.

The selection is carried out automatically and does not require any additional user input.

When the multimedia data includes image date, the process can additionally comprise a step of producing a photo-album and/or a slideshow using the selected subset of data.

The term 'individuals' describes the basic conceptualized elements of the ontology. These individuals are divided into either generic individuals or contingent individuals.

The full set of generic individuals and the related semantic links can form one or more generic ontologies. The generic ontology is used as the basic structure for organizing the multimedia data. The multimedia data are represented by contingent individuals that through semantic links are associated with individuals in the generic ontology. The generic ontology and the generic individuals are preferably not liable to be created or modified by a user implementing the process.

The contingent individuals on the other hand are indeed liable to get associated with knowledge content by the user. Examples of contingent individuals could include pointers towards existing multimedia data or towards data liable to be captured by the user.

The term 'pointer' describes an address or any other piece of information that makes it possible to identify, locate or find a multimedia data. A multimedia data object is considered as being associated with an individual of the ontology whenever this individual has a pointer to this multimedia data object.

The group formed by the generic ontology and the contingent individuals associated to it by means of semantic links is termed 'instantiated ontology.'

The instantiated ontology is used in association with one or preferably several selection and organization rules. The association of rules and instantiated ontology forms an organization system that is geared to multimedia data designed to be presented, and especially photographs.

Thanks to the invention the data, and especially the digital photos can be organized without labeling the photos and without a semantic content analysis.

The selection and organization of the presentation-focused multimedia data essentially depends on one or more individuals selected by the user. The panel of individuals offered to the user can include generic individuals, contingent individuals, or combinations of the two.

In a preferred implementation of the invention, the panel of choices offered to the user includes generic individuals.

The organization rule or organization ruleset can be immutable and unique. It is also possible to allow for several rulesets liable to be selected either directly by the user or according to the form of the presentation the user requires. To illustrate this point, it is possible to have a ruleset that applies when the data organization is aimed at producing a photo album and another ruleset for when the data organization is aimed at producing a video clip or a slideshow.

In a simplified implementation of the method, a single parametric or non-parametric rule can be used. This kind of rule would for example consist of selecting multimedia data associated with individuals from the ontology presenting a direct semantic link with the individual selected by the user.

It is possible to redistribute generic individuals into classes of individuals sharing common characteristics, in which case the section rules can also involve classes.

In this way, a rule in a ruleset can be selected according to the individual or individuals selected by the user or according to the class group of the user-selected individual or individuals, in which case the number of rules can for example be equal to the number of generic individuals in the ontology. One rule can, for example, be associated to each generic individual and/or to each class of individuals.

The process according to the invention is liable to be implemented based on an instantiated ontology given to the user. However, the method can also advantageously include a preliminary step involving the assisted creation of the instantiated ontology based on a generic ontology. In this scenario, the user need only be provided with one ontology or several generic ontologies.

The assisted creation offered to the user may involve providing suitable means of sorting. This would for example include configuring a data capture equipment interface according to a user-selected generic ontology, in which case the configuration step would offer the user a specific multimedia data sorting option.

To illustrate this point, when the user chooses a generic ontology, a display icon and/or control key can be associated with each generic individual in the ontology. If a PC equipped with a mouse is used as the interface, then the sort-through can be performed via drag-and-drop between icons representing the multimedia data and icons representing the individuals in the generic ontology.

The user-directed sort-through results in the creation of semantic links. The process in fact comprises the creation of semantic links between contingent individuals associated with the multimedia data and generic individuals in the selected ontology representing sort categories into which the user assigns the multimedia data. Semantic links are therefore created as a function of the user-performed sort-through.

Other characteristics and advantages of the invention will appear in the following description, which refers to the figures of the appended drawings. This description is given purely as an illustration and is not an exhaustive example.

DETAILED DESCRIPTION OF THE INVENTION

Figure 1:
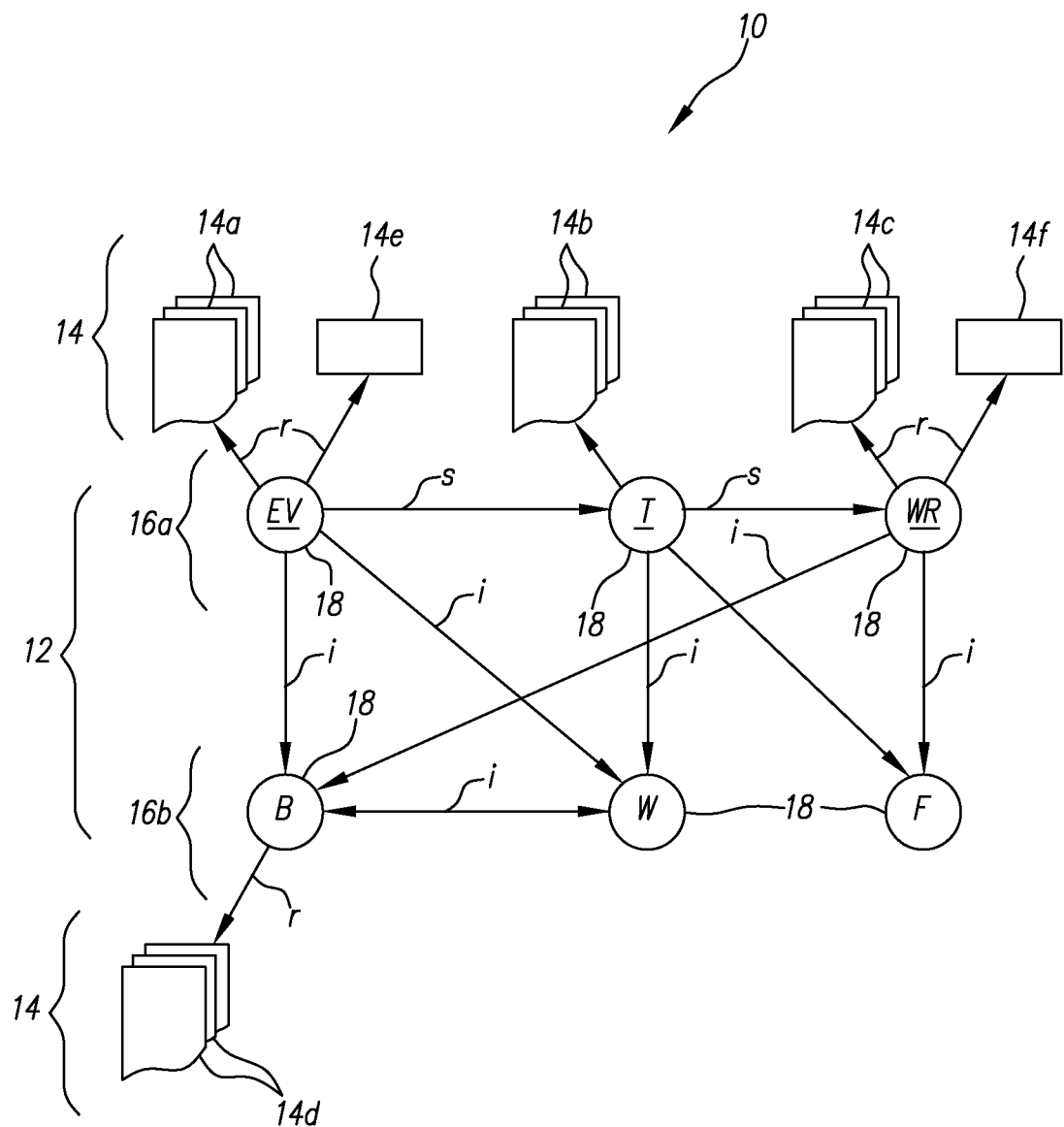
FIG. 1 is a simplistic diagrammatic illustration of a type of instantiated ontology liable to be used to implement a process according to the invention.

FIG. 1 is a simplistic diagrammatic illustration of an instantiated ontology 10 including a generic ontology 12 and a certain number of contingent individuals 14.

The generic ontology comprises two classes of individuals 16a and 16b, each of which includes a certain number of generic individuals 18.

For illustrative purposes, the description of the figures covers a generic ontology designed for organizing digital data relating to a marriage.

Hence, the first class of individuals 16a comprises individuals related to episodes occurring during a marriage. The episodes illustrated correspond to the exchange of vows EV during a civil or religious marriage ceremony, to a toast T, and to a wedding reception WR.

There is a generic individual in the ontology for each different episode.

In the class of individuals 16b, the individuals represent the typical roles in a marriage ceremony. For illustrative purposes, the figure features bridegroom B, witness W and a friend F.

The generic ontology also contains a certain number of generic semantic links. The semantic link "is followed by" is indicated by a reference s and links together individuals in the class of episodes 16a. The generic ontology thus contains the knowledge that the wedding vows are followed by a toast that in turn is followed by a wedding reception.

In the same way, the generic semantic link "is important for", which is indicated with a reference i, links individuals in the class of episodes 16a together with individuals in the class of wedding ceremony roles 16b as well as individuals within the wedding roles class. Thus, in the example illustrated, the generic ontology contains the knowledge that the exchange of vows and the wedding ceremony are key moments for the bridegroom, that the exchange of vows and the toast are key moments for the witness, and so on.

The contingent individuals 14 are or include pointers or addresses or identifiers of multimedia data. To simplify the description, pointers, addresses and identifiers are treated as the multimedia data they represent. Hence, in the rest of the text we will voluntarily stretch the meaning of the words and refer to contingent individuals as "multimedia data".

In the example illustrated, the multimedia data includes digital photo files 14a, 14b, 14c and 14d and text files 14e and 14f liable to contain text previously entered by a user.

Multimedia data 14 are linked to the generic individuals of generic ontology 12 by the semantic links "is represented by" identified with the reference r. Hence, the exchange of vows is represented by the set of photos 14a whereas the bridegroom is represented by a set of photographs 14d. Semantic links r are in turn designated "contingent semantic links".

Although not included in the figure for the obvious purpose of keeping it clear, it cannot be excluded that the same photograph, and by extension the same contingent individual 14 may have semantic links connecting it to different generic individuals in the generic ontology.

Figure 2:
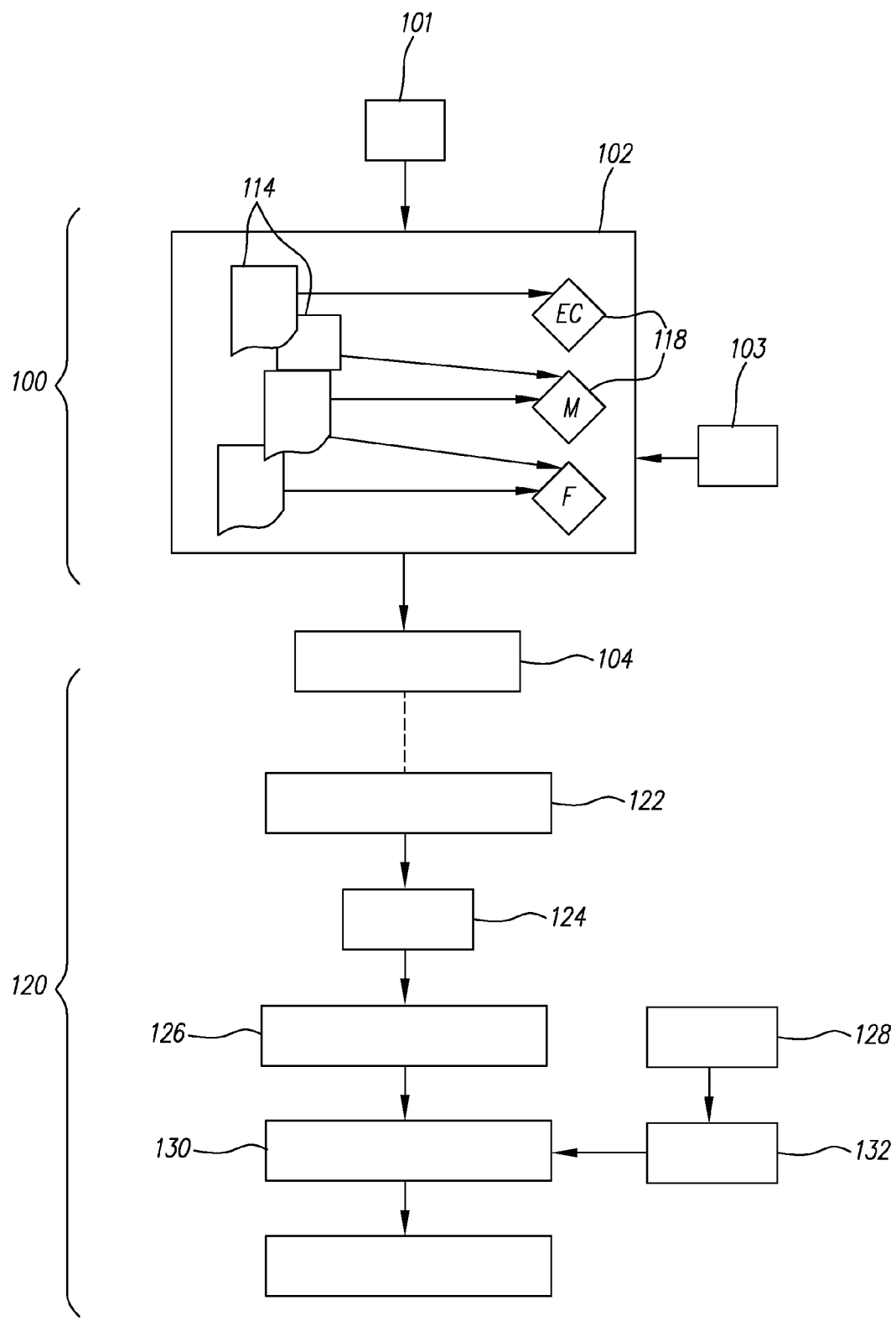
FIG. 2 is a flow chart showing the main steps of a multimedia data organization process implementing the invention.

FIG. 2 illustrates another option for implementing the invention. We begin by describing a preliminary sort-through step 100. This step is not strictly speaking an integral part of the organization method itself, and is not necessarily implemented by the same user as the user looking to organize data in order to present it. The sort-through step corresponds to the creation of an instantiated ontology. The method can, however, be implemented using an existing instantiated ontology.

A first step 101 in the preliminary phase comprises the selection of a generic ontology. In the example illustrated, this generic ontology is a marriage-related ontology. Similarly, other generic ontologies can be provided to handle other events such as a birthday, a holiday, etc. In each case, the generic individuals can correspond to events, places, people, situations, and more generally any foreseeable subject typically encountered in the target context and which is liable to have multimedia data relating to it.

Once the generic ontology has been selected, a sorting interface can be automatically configured in a step 102 designed to best adapt the generic ontology to the sort-through process. In the example illustrated, a screen display can be configured to make an icon 118 correspond to each respective generic individual in the ontology. Only a limited number of icons are shown in the figure. Following the same process, it would be possible to assign a control key to each of the generic individuals in the generic ontology selected.

The user could therefore use a mouse and a drag-and-drop command to match icons 114 representing multimedia data to icons representing generic individuals. This sort-through step can also include the entering of text corresponding to the text data 14e and 14f in FIG. 1. This text input step is shown by reference 103. Similarly, data can also be entered in the form of voice commentaries or music.

The user commands are used to create contingent semantic links and thereby build an instantiated ontology in a further step 104. The contingent semantic links are the semantic links referenced r in FIG. 1. They link multimedia data to generic individuals in the generic ontology.

This is thus completed when the instantiated ontology has been built.

The data organization process itself, 120, can use the instantiate ontology built through step 104 or any other instantiated ontology of the same type that comprises multimedia data.

A first step 122 comprises the selection of an instantiated ontology. This amounts to simultaneously selecting a multimedia dataset, for example a set of digital photos, and a set of knowledge relating to this dataset. The knowledge is in particular stored in the generic and contingent links linking together the individuals in the instantiated ontology.

Once the ontology has been chosen, the user is presented with another choice option 126: the choice of one or more individuals. This choice may be preceded by screen display 124 of a certain number of icons relating to individuals in the instantiated ontology selected. This step can also take place by configuring a keyboard or any other ad hoc interface.

The choice given to the user can be restricted to generic individuals or it may also include contingent individuals. Otherwise, it may be possible to limit the individuals offered in this choice according to the number of semantic links attached to them.

The choice step involves the user selecting one or possibly more of the individuals offered for selection.

To illustrate this, the individuals available for selection may be individuals EV, C, WR, B, W and F in FIG. 1. The individual selected by the user could, therefore, be individual C (ceremony).

Another choice 128 can be presented to the user. This is the choice of media or mode of data presentation. For example, if the multimedia data is mainly photograph-related, the user can choose whether the multimedia data is earmarked for presentation as a slideshow or as a photo album.

The selection and organization of a subset of multimedia data is then carried out via a step 130. This step calls on a ruleset 132 that may, if necessary, be selected according to the presentation format chosen during the second choice 128.

These rules are pre-established and they can be related to contingent or generic semantic links just as they can be related to contingent or semantic individuals. These rules determine the multimedia data that has to be selected taking into account the user's choice or choices.

A certain number of examples can be given:
(a) select all the multimedia data (contingent individuals) related to a given generic individual if the user selects this generic individual.
(b) take all the multimedia data linked related to the generic individual to which a user-chosen multimedia data (contingent individual) is linked.
(c) take all the multimedia data linked to an individual chosen by the user by a number of successive links below X.
(d) randomly select x percent of the multimedia data linked to the individual chosen by the user and 100-x percent of the multimedia data linked to the individual by less than y consecutive "is followed by" links.

These examples highlight how the rules can be specific to generic individuals or classes of individuals. They may also be generic themselves, by considering for example a number of links.

The rules can also apply to the organization of data and how it is presented. To illustrate this point, if the user has chosen to present the data as a photo album, there can be a rule stating for example that the print format for a photo in the album shall depend on the number of semantic links linking the contingent individual representing this photograph to generic individuals. A single link would for example result in a small presentation format, two links in a middle-sized format, and more than two links in large formats.

The method according to the invention can advantageously be used to create a multimedia presentation product designed specially for the target recipient.

Staying with our example of producing a photo album, it is possible, during the choice of individual step 126, to offer the user either a broader choice covering a set of individuals in the ontology, or else a more limited choice. For example, this choice can be limited to the individuals within a class.

Thus, focusing on the class of wedding roles 16b in FIG. 1, the user can choose an organization more specifically targeting the bridegroom B, the witness W or the friend F.

If, for example, the rule is to select the photos related to the individual chosen (W) by less that three successive links, the photo album will mostly contain photos of the bridegroom, the exchange of vows ceremony, and the toast. The photos are related to the witness W by links i and r only. The witness in this example would, however, only receive photos of the wedding reception WR or the friend F, which suppose at least three consecutive links, for example, from 14c to WR, from WR to T and from T to W.

Rules engaging the semantic links s "is followed by" can be used to chronologically sequence the selected photographs.

It is possible to include a set of successive conditional rules running in the order from the most restrictive rules to the least restrictive rules. Since the use of a more restrictive rule is conditioned by the fact that it can generate a sufficient number of multimedia objects given the presentation format and the number of multimedia objects that the presentation needs to contain. Users can be offered this option during step 128.

In a multimedia content on-demand distribution system, the generic ontologies can be saved on a server managed by the on-demand distribution service provider and the user choices mentioned hereabove can be made remotely via a communication network.

The invention claimed is:
1. A multimedia data organization process comprising:
providing a single instantiated ontology comprising (i) generic individuals, (ii) generic semantic links between the generic individuals, wherein the generic individuals and the generic semantic links between the generic indi- viduals form a basic organization structure, and (iii) contingent individuals and contingent semantic links, each contingent semantic link respectively linking a contingent individual and a generic individual, wherein each contingent individual represents multimedia data;

receiving a choice of at least one selected individual, wherein the at least one selected individual is one or more of a generic individual from the instantiated ontology, a contingent individual from the instantiated ontology, or a combination of a generic and a contingent individual from the instantiated ontology; and in response to receiving the choice, selecting and organizing a subset of multimedia data corresponding to the contingent individuals of the instantiated ontology as a function of at least one of a selection rule or an organization rule, wherein the at least one of a selection rule or an organization rule engages the at least one selected individual and semantic links related to the at least one selected individual.

2. The process according to claim 1, wherein two or more of the generic individuals are distributed into classes of individuals having shared characteristics, and wherein the selection rule and the organization rule engage the classes of individuals.

3. The process according to claim 2, wherein each of the selection rule and the organization rule is part of a ruleset, and wherein the ruleset comprises at least one rule associated with each class of individuals.

4. The process according to claim 1, wherein the contingent individuals comprise pointers to multimedia data.

5. The process according to claim 1, wherein the selection rule is part of a ruleset that operates as a function of a user-selected data presentation format.

6. The process according to claim 1, wherein each of the selection rule and the organization rule is part of a ruleset, and wherein the ruleset comprises one rule associated with each generic individual in the ontology.

7. The process according to claim 1 further comprising, providing the preliminary creation of the instantiated ontology, the preliminary creation of the instantiated ontology comprising:

providing a generic ontology including the generic individuals and semantic links between the generic individuals;

providing contingent individuals associated with multimedia data; and facilitating creation of semantic links between the contingent individuals and the generic individuals.

8. The process according to claim 7, further comprising using a data capture hardware interface to facilitate sorting the multimedia data according to a selected generic ontology.

9. The process according to claim 8, further comprising creating semantic links between contingent individuals associated with multimedia data and generic individuals of the selected ontology, wherein the semantic links are created according to a sort-through operation.

10. The process according to claim 1, further comprising using the subset of multimedia data to produce a photo album.

11. The process according to claim 1, further comprising using the subset of multimedia data to produce a slideshow.

12. The process according to claim 1, wherein the basic organization structure is not modifiable by selecting and organizing the subset of multimedia data.

13. The process according to claim 1, wherein selecting and organizing the subset of multimedia data is performed without referring to any labels stored on the multimedia data.

14. The process according to claim 13, wherein selecting and organizing the subset of multimedia data is performed without performing semantic content analysis.

15. A non-transitory computer-readable medium having stored thereon program instructions executable by at least one processor to cause the processor to perform certain functions, the functions comprising:

providing a single instantiated ontology comprising (i) generic individuals and generic semantic links between the generic individuals, wherein the generic individuals and the generic semantic links between the generic individuals form a basic organization structure and the (ii) contingent individuals and contingent semantic links, each contingent semantic link respectively linking a contingent individual and a generic individual, wherein each contingent individual represents multimedia data;

receiving a choice of at least one selected individual, wherein the at least one selected individual is one or more of a generic individual from the instantiated ontology, a contingent individual from the instantiated ontology, or a combination of a generic and a contingent individual from the instantiated ontology; and in response to receiving the choice, selecting and organizing a subset of multimedia data corresponding to the contingent individuals of the instantiated ontology as a function of at least one of a selection rule or an organization rule, wherein the at least one of a selection rule or an organization rule engages the at least one selected individual and semantic links related to the at least one selected individual.

16. The computer-readable medium according to claim 15, wherein two or more of the generic individuals are distributed into classes of individuals having shared characteristics, and wherein the selection rule and the organization rule engage the classes of individuals.

17. The computer-readable medium according to claim 15, wherein the contingent individuals comprise pointers to multimedia data.

18. The computer-readable medium according to claim 15, wherein each of the selection rule and the organization rule is part of a ruleset, and wherein the ruleset comprises one rule associated with each generic individual in the ontology.

19. The computer-readable medium according to claim 15, wherein the selection rule is part of a ruleset that operates as a function of a user-selected data presentation format.

20. A system for organizing multimedia data, the system comprising:

a processor;

a communication interface configured to receive a choice of at least one selected individual of a single instantiated ontology, wherein the at least one selected individual is one or more of a generic individual from the instantiated ontology, a contingent individual from the instantiated ontology, or a combination of a generic and a contingent individual from the instantiated ontology; and a computer-readable medium having stored thereon program instructions executable by the processor to cause the system to:

provide the instantiated ontology comprising (i) generic individuals and generic semantic links between the generic individuals, wherein the generic individuals and the generic semantic links between the generic individuals form a basic organization structure and (ii) contingent individuals and contingent semantic links, each contingent semantic link respectively linking a contingent individual and a generic individual, wherein each contingent individual represents multimedia data; and in response to receiving the choice via the communication interface, select and organize a subset of multimedia data corresponding to the contingent individuals of the instantiated ontology as a function of at least one of a selection rule or an organization rule, wherein the at least one of a selection rule or an organization rule engages the at least one selected individual and semantic links related to the at least one selected individual.

* * * * *